US 8,654,795 B2

(12) United States Patent
Shi

(10) Patent No.: US 8,654,795 B2
(45) Date of Patent: Feb. 18, 2014

(54) PACKET DATA TRANSMITTING METHOD AND SYSTEM FOR PACKET SERVICE DOMAIN

(75) Inventor: Xuehong Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 144 days.

(21) Appl. No.: 13/504,930

(22) PCT Filed: Apr. 22, 2010

(86) PCT No.: PCT/CN2010/072077
§ 371 (c)(1),
(2), (4) Date: Apr. 27, 2012

(87) PCT Pub. No.: WO2010/145321
PCT Pub. Date: Dec. 23, 2010

(65) Prior Publication Data
US 2012/0219018 A1    Aug. 30, 2012

(30) Foreign Application Priority Data
Nov. 3, 2009  (CN) .......................... 2009 1 0207431

(51) Int. Cl.
*H04J 3/00*    (2006.01)
(52) U.S. Cl.
USPC ............ 370/498; 370/412; 370/474; 370/475
(58) Field of Classification Search
USPC .......................... 370/412–418, 474–476, 498
See application file for complete search history.

(56) References Cited

U.S. PATENT DOCUMENTS

| 2002/0110095 | A1* | 8/2002 | Jiang et al. | 370/328 |
| 2002/0126629 | A1* | 9/2002 | Jiang et al. | 370/328 |
| 2003/0177437 | A1* | 9/2003 | Wu | 714/776 |
| 2004/0151154 | A1* | 8/2004 | Wu | 370/349 |
| 2005/0047525 | A1* | 3/2005 | Lee | 375/316 |
| 2008/0025314 | A1* | 1/2008 | Lee et al. | 370/394 |
| 2009/0103478 | A1* | 4/2009 | Sammour et al. | 370/328 |

FOREIGN PATENT DOCUMENTS

| CN | 1437369 A | 8/2003 |
| EP | 1511214 A2 | 3/2005 |

* cited by examiner

*Primary Examiner* — Andrew Chriss
*Assistant Examiner* — Romani Ohri
(74) *Attorney, Agent, or Firm* — Bright IP Law Offices

(57) ABSTRACT

A packet data transmitting method for packet service domain is disclosed. After receiving a Service Data Unit (SDU), a Packet Data Convergence Protocol (PDCP) entity determines how to handle the SDU in a cache queue and process a Protocol Data Unit (PDU) record in a Serial Number (SN) window based on whether or not the cache queue includes any SDU and the SN window is full, respectively. When both the cache queue and the SN window are full, the PDCP entity processes PDU records in the SN window according to their respective weight values and processes an SDU in the cache queue into a new PDU accordingly. A packet data transmitting system for packet service domain is also disclosed, which can prolong the time window for confirming a PDU record in the SN window.

14 Claims, 4 Drawing Sheets

PACKET DATA TRANSMITTING METHOD AND SYSTEM FOR PACKET SERVICE DOMAIN

CROSS REFERENCE TO RELATED APPLICATIONS

This application is the U.S. National Stage of International Patent Application No. PCT/CN2010/072077 filed on Apr. 22, 2010, which claims priority to Chinese Patent Application No. 200910207431.4 filed on Nov. 3, 2009. Both the PCT Application and Chinese Application are hereby incorporated by reference in their entirety.

FIELD OF THE INVENTION

The disclosure relates to the data transmission technology of communication system, and in particular to a packet data transmitting method and system for packet service domain.

BACKGROUND OF THE INVENTION

In Time Division-Synchronous Code Division Multiple Access (TD-SCDMA) standard, a packet data convergence protocol layer is only applied to a Packet Service (PS) domain, a Radio Access Bearer (RAB) of each PS domain is associated with a Radio Bearer (RB), each RB is associated with a Packet Data Convergence Protocol (PDCP) entity, and each PDCP entity is associated with a Radio Link Control (RLC) layer entity. Each PDCP entity may have many different types of head compression protocol. At User Equipment (UE) side, the PDCP entity provides service for the Non-Access Stratum (NAS) and realizes signal relaying function in a Radio Network Controller (RNC).

The service provided for the upper level by the PDCP entity is called radio bearer; the main functions of the PDCP layer include: (1) respectively completing the head compression and decompression for the IP data stream in the transmitting and receiving PDCP entity, for example, completing the head compression and decompression for signal of the TCP/IP and RTP/UDP/IP of the IPv4 and IPv6; (2) transmitting the user data; and (3) maintaining the serial number of PDCP entity for the RB which is configured to support the relocation of lossless Serving Radio Network Subsystem (SRNS).

In the cellular mobile communication system, because the coverage of single base station is limited, when the UE enters another cell from one cell during the communication process, in order to ensure the continuity of communication, the system transfers the connection between the UE and original cell to a new cell, which is cell handoff. The UE can perform handoff among different cells which are under the same base station controller as well as among different systems and different base station controllers. When the UE switches the base station controller during handoff, one needs to relocate the UE. In the TD-SCDMA system, the process of handoff from the source RNC to the target RNC causes the relocation of SRNS.

To support the lossless relocation function, the PDCP entity is added with a Serial Number (SN) window; according to description of the 3GPP TS 25.323 protocol, the PDCP entity in an SN window is what the Protocol Data Unit (PDU) needs to transmit to the RLC layer entity; and the 3GPP TS 25.323 protocol clearly prescribes that there are unconfirmed PDU records stored in the SN window, and the maximum number of the stored unconfirmed PDU records is the size of the configured SN window, that is, 255 or 65535. After the service of PS domain starts, the data size is large, and more exchanged data packets are needed for the upper-layer application; in addition, when the PDCP entity supports the lossless relocation, after receiving a confirmation of PDU from the RLC layer entity of the opposite end, the RLC layer entity at this side reports the confirmation of PDU to the PDCP entity; however, due to the bad signal of network transmission and other reasons, the PDU just fed back and confirmed by the RLC layer entity of the opposite end is not necessarily the PDU associated with the first PDU record stored in the PDCP entity at this side, so, in the SN window of the PDCP entity, a PDU record of a confirmed PDU cannot be deleted immediately, but it is needed to determine whether the PDU of a previous PDU record is confirmed; the PDU record of the confirmed PDU can be deleted only after the PDU of the first PDU record is confirmed.

Thus, if the PDU of the first PDU record is not confirmed, the subsequent PDU records are piled in the SN window, until the SN window is jammed.

Currently, there are two processing methods as follows: a simple discarding method and an earliest discarding method.

The simple discarding method, as shown in FIG. 1, has the following steps:

Step 101: after receiving a Service Data Unit (SDU), the PDCP entity reads the number of PDU records in the SN window, which is defined as W;

Step 102: the PDCP entity determines whether the W is less than an initially configured size of the SN window, that is, 255 or 65535, if so, the PDCP entity executes Step 103, otherwise, the PDCP entity executes Step 104;

Step 103: the PDCP entity encapsulates the SDU into a PDU in accordance with the 3GPP TS 25.323 protocol and transmits to the RLC layer entity, and adds a PDU record of this PDU into the SN window; and Step 104: the PDCP entity discards the SDU.

The earliest discarding method, as shown in FIG. 2, has the following steps:

Step 201: after receiving an SDU, the PDCP entity reads the number of PDU records in the SN window, which is defined as W;

Step 202: the PDCP entity determines whether the W is less than an initially configured size of the SN window, that is, 255 or 65535, if so, the PDCP entity executes Step 203, otherwise, the PDCP entity executes Step 204;

Step 203: the PDCP entity encapsulates the SDU into a PDU in accordance with the 3GPP TS 25.323 protocol and transmits to the RLC layer entity, and adds a PDU record of this PDU into the SN window; and Step 204: the PDCP entity discards the first PDU record in the SN window, encapsulates the SDU into a PDU in accordance with the 3GPP TS 25.323 protocol and transmits to the RLC layer entity, and adds a PDU record of this PDU into the SN window.

The simple discarding method above, when the SN window is full, discards the received SDU directly, which is problematic for not solving problem essentially, namely, not considering the reason why the SN window is full, thus causing the loss of SDU once the SN window is full; the earliest discarding method above, when the SN window is full, discards the earliest PDU record in the SN window so as to convert the newly added SDU into a PDU to be transmitted to the RLC layer entity, which is problematic for not trying to store the unconfirmed PDU record for a time period as long as possible, thus making it impossible to retransmit the PDU needed by the opposite end in case of the relocation of a lossless SRNS.

SUMMARY OF THE INVENTION

In view of these, the disclosure mainly aims to provide a packet data transmitting method and system for packet service domain, thus improving the efficiency of lossless transmission during data transmission of packet service domain.

To achieve the objectives above, the technical solution of the disclosure is realized by:

a packet data transmitting method for packet service domain realized by the disclosure, comprising:

a Packet Data Convergence Protocol (PDCP) entity determining whether a Serial Number (SN) window is full after receiving a Service Data Unit (SDU);

when the Serial Number (SN) window is full, the PDCP entity adding the SDU in a cache queue, deleting a PDU record whose weight value exceeds a threshold value from the SN window when the cache is full, processing a first SDU in the cache queue as a PDU, transmitting the PDU to the RLC layer entity, and adding a PDU record of the transmitted PDU into the SN window; wherein the PDU record has a respective weight value for indicating a length of time of the PDU record in the SN window;

when the SN window is not full and there is at least one SDU is in the cache queue, the PDCP entity processing a first SDU in the cache queue into a PDU, transmitting the PDU to the RLC layer entity, and adding a PDU record of the transmitted PDU into the SN window;

in the solution above, the method further comprises: when the SN window is not full and there is no SDU in the cache queue, the PDCP entity processing the newly received SDU into a PDU, transmitting the PDU to the RLC layer entity, and adding a PDU record of the transmitted PDU into the SN window;

in the solution above, the method further comprises: when there is no PDU record in the SN window whose weight value exceeds the threshold value, the PDCP entity discarding a first PDU record in the SN window, processing a first SDU in the cache queue into a PDU, transmitting the PDU to the RLC layer entity, and adding a PDU record of the transmitted PDU into the SN window;

in the solution above, the processing of the SDU into the PDU is to encapsulate the SDU into the PDU in accordance with the 3GPP TS 25.323 protocol;

in the solution above, the step of determining whether the SN window is full or not includes: determining whether a total number of PDU records in the SN window is less than a preconfigured size of the SN window such that, if the total number is less than the preconfigured size, the SN window is not full, otherwise, the SN window is full;

in the solution above, the weight value of a PDU record in the SN window is determining by: setting a timer in the SN window, and setting an initial weight value for each PDU record in the SN window to zero; before adding the PDU record to the SN window, determining whether there is another PDU record in the SN window, such that: if there is another PDU record in the SN window, starting the timer that was stopped previously; and if there is no PDU record in the SN window, stopping the timer, adding the PDU record to the SN window, and restarting the stopped timer; and when the timer is up, determining whether there is any PDU record in the SN window, such that: if there is one or more PDU records in the SN window, increasing the weight value of each PDU record in the SN window according to a preset step value and then restarting the timer; and if there is no PDU record in the SN window, stopping the timer;

a packet data transmitting system for packet service domain realized by the disclosure, comprising:

a cache module which is used for: determining whether there is any SDU in a cache queue after a PDCP entity receives a SDU and sending a result of the determination to a SN window module; adding the SDU into the cache queue when receiving a notice that a SN window is full or after receiving a notice from a SDU extracting module; and informing the SN window module when the cache queue is full;

the SN window module which is used for: informing the SDU extracting module when the SN window is not full and the result of the determination is that there is at least one SDU in the cache queue; or when the SN window is full, informing the cache module that the SN window is full and deleting a PDU record from the SN window, wherein the PDU record has a weight value exceeding a threshold value and informing the SDU extracting module when receiving a notice that the cache queue is full; and adding a PDU record of a processed PDU into the SN window after receiving a notice from a SDU processing module;

the SDU extracting module which is used for extracting a first SDU in the cache queue and transmitting it to the SDU processing module, and informing the cache module; and the SDU processing module which is used for processing a SDU extracted by the SDU extracting module into a PDU, transmitting the PDU to an RLC layer entity, and informing the SN window module;

in the solution above, the SN window module is further used for, when the SN window is not full and the result of the determination is that there is no SDU in the cache queue, informing the SDU processing module, and when there is no PDU record in the SN window whose weight value exceeds the threshold value, discarding a first PDU record from the SN window and informing the SDU extracting module; and;

in the solution above, the SDU processing module is further used for, after receiving a notice from the SN window module, processing the SDU received by the PDCP entity into a PDU, transmitting the PDU to the RLC layer entity, and informing the SN window module.

The disclosure provides a packet data transmitting method and system for packet service domain, in which, after the PDCP entity receives the SDU, the PDCP entity determines how to handle the SDU in a cache queue and process a Protocol Data Unit (PDU) record in a Serial Number (SN) window based on whether or not the cache queue includes any SDU and the SN window is full, respectively. When both the cache queue and the SN window are full, the PDCP entity processes PDU records in the SN window according to their respective weight values and processes an SDU in the cache queue into a new PDU accordingly to avoid discarding the SDU and prolong the time window for confirming a PDU record in the SN window, so that the retransmission of a PDU lost by the opposite end can be maximized in case of the relocation of a lossless serving radio network subsystem, thus improving the efficiency of lossless transmission.

DETAILED DESCRIPTION OF THE EMBODIMENTS

Figure 1:
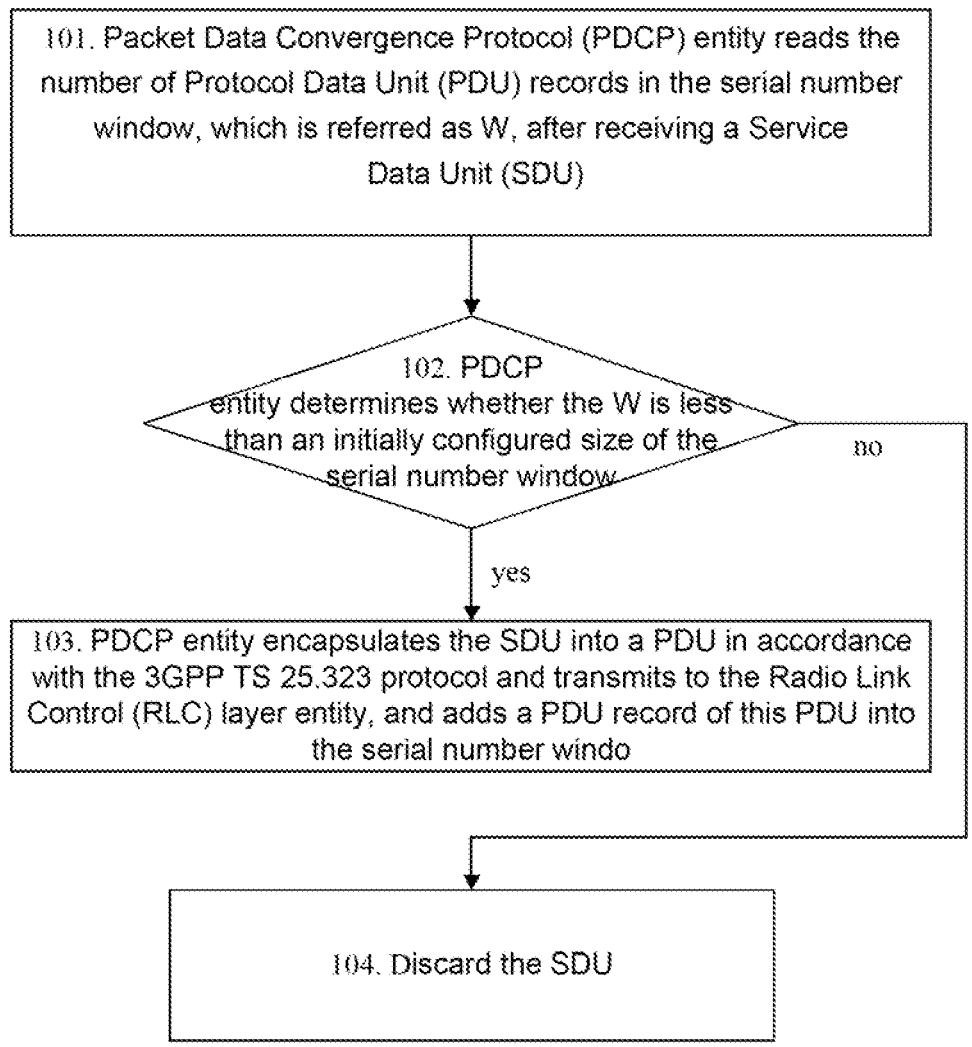
FIG. 1 shows a flowchart of a simple discarding method in the conventional art.
Figure 2:
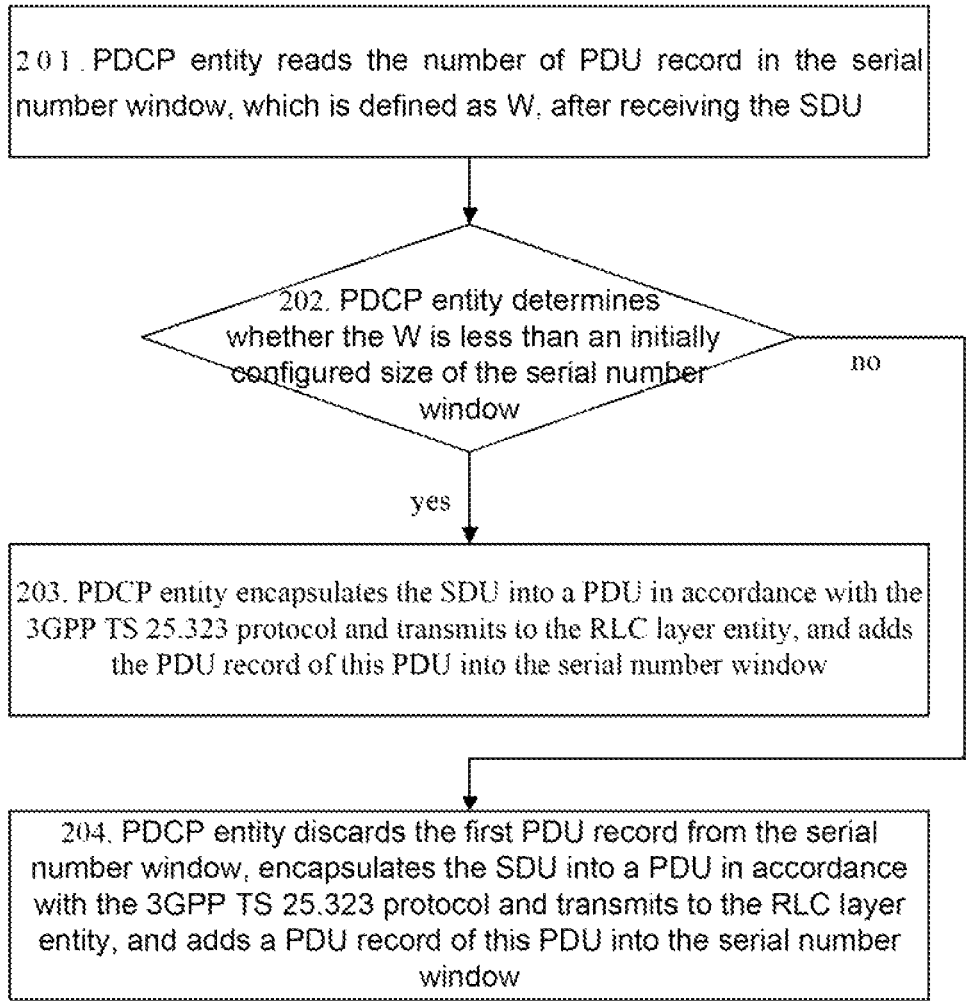
FIG. 2 shows a flowchart of an earliest discarding method in the conventional art.

During design of the mobile communication system, under the premise of supporting the relocation of lossless SRNS, the PDCP entity should store, in the SN window, the PDU record of PDU which may be lost to the utmost extent, so as to ensure the PDCP layer can retransmit the lost PDU to the utmost extent in case of relocation of lossless SRNS.

The basic idea of the disclosure is that: after the PDCP entity receives the SDU, the PDCP entity determines how to handle the SDU in a cache queue and process a Protocol Data Unit (PDU) record in a Serial Number (SN) window based on whether or not the cache queue includes any SDU and the SN window is full, respectively. When both the cache queue and the SN window are full, the PDCP entity processes PDU records in the SN window according to their respective weight values and processes an SDU in the cache queue into a new PDU accordingly.

Specifically, after receiving the SDU, the PDCP entity determines whether there is any SDU in the cache queue, and determines whether the SN window is full, if there is at least one SDU in the cache queue and the SN window is not full, the PDCP entity processes a first SDU in the cache queue into a PDU, transmitting the PDU to the RLC layer entity, and adding a PDU record of the transmitted PDU into the SN window;

if there is at least one SDU in the cache queue and the SN window is full, the PDCP entity determines whether the maximum limit to the quantity of cached SDUs is reached, if so, the PDCP entity determines whether there is a PDU record in the SN window that has a weight value exceeding a threshold value; if so, the PDCP entity first delete the PDU record, and if otherwise, the PDCP entity first discards a first PDU record in the SN window, and then processes a first SDU in the cache queue into a PDU, transmits the PDU to the RLC layer entity, and adds a corresponding PDU record of the PDU into the SN window; if the maximum limit to the cache is not reached, the PDCP entity adds the received SDU into the cache queue;

if there is no SDU in the cache queue and the SN window is not full, the PDCP entity processes the received SDU into a PDU, transmits the PDU to the RLC layer entity, and adds a corresponding PDU record of the PDU into the SN window; and if there is no SDU in the cache queue and the SN window is full, the PDCP entity adds the received SDU into the cache queue.

The processing of an SDU into a PDU is achieved by encapsulating the SDU into the PDU in accordance with the 3GPP TS 25.323 protocol.

The maximum limit of the cache queue above can be determined according to the memory of the equipment itself, for example, 100 SDUs.

Determining whether the SN window is full is achieved by: determining whether the number of PDU record in the SN window is less than a preconfigured size of the SN window, if so, the SN window is deemed to be not full, otherwise, the SN window is deemed to be full.

The weight value of the PDU record above is specifically determined by: setting a timer in the SN window, and setting an initial weight value for each PDU record in the SN window to zero; before adding the PDU record to the SN window, determining whether there is another PDU record in the SN window, such that: if there is another PDU record in the SN window, starting the timer that was stopped previously; and if there is no PDU record in the SN window, stopping the timer, adding the PDU record to the SN window, and restarting the stopped timer; and when the timer is up, determining whether there is any PDU record in the SN window, such that: if there is one or more PDU records in the SN window, increasing the weight value of each PDU record in the SN window according to a preset step value and then restarting the timer; and if there is no PDU record in the SN window, stopping the timer; the preset time of the timer is determined according to the needs of practical applications, for example, 100 ms; and the step value is commonly set as 1.

Determining whether there is any PDU record in the SN window whose weight value exceeds the threshold value is achieved by: presetting the threshold value of the weight value of PDU record according to the needs of practical applications, for example, to 50, and then determining by comparing the weight value of PDU record with the preset threshold value.

The disclosure is described below with reference to the accompanying drawings and embodiments in detail.

Figure 3:
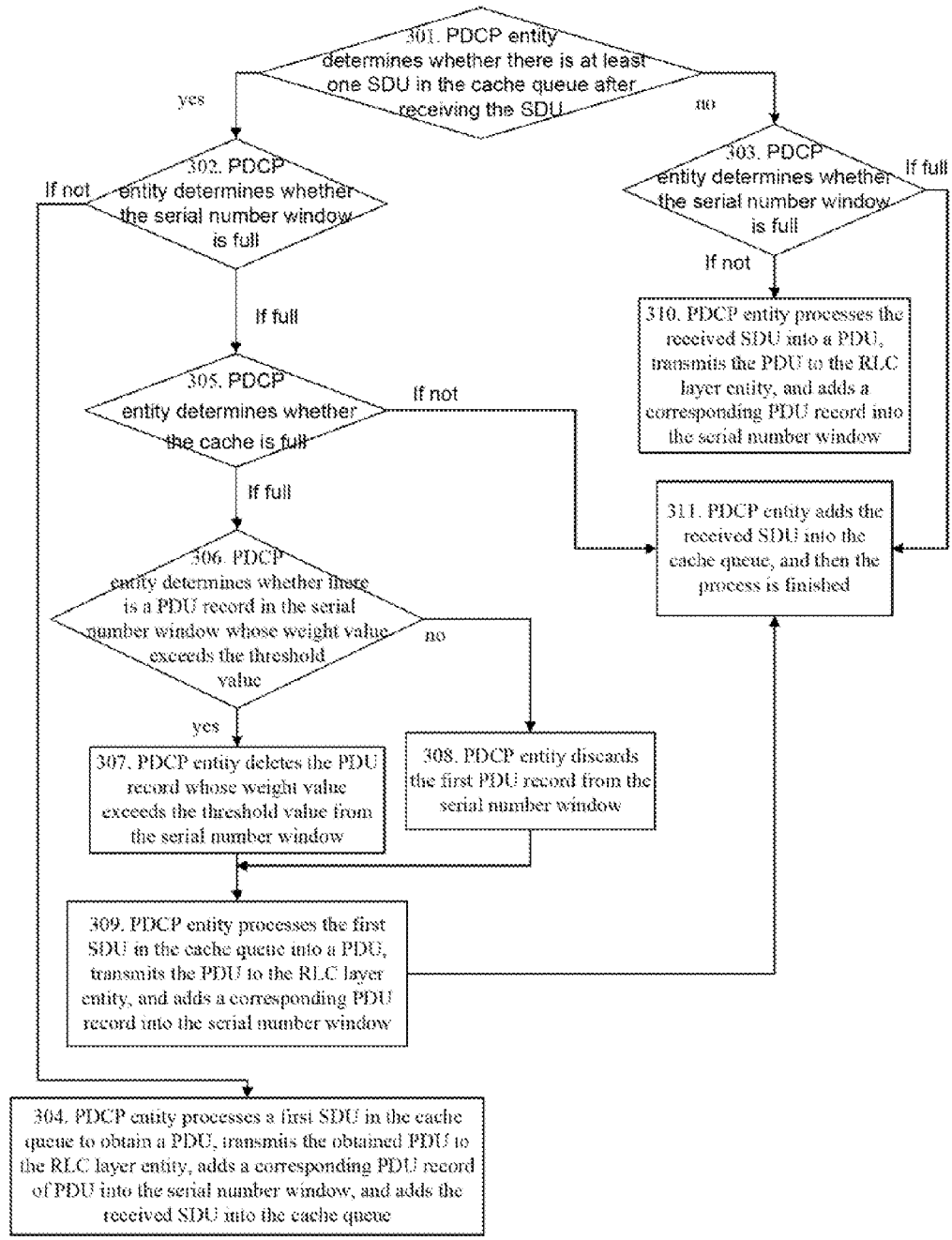
FIG. 3 shows a flowchart of a packet data transmitting method for packet service domain of the disclosure.

The packet data transmitting method for packet service domain of the disclosure, as shown in FIG. 3, comprises the following steps:

Step 301: after receiving an SDU, the PDCP entity determines whether there is any other SDU cached in the cache queue, if so, the PDCP entity executes Step 302, otherwise, the PDCP entity executes Step 303;

Step 302: the PDCP entity determines whether the SN window is full, if not, the PDCP entity executes Step 304, if full, the PDCP entity executes Step 305;

specifically, the PDCP entity determines whether the number of PDU record in the SN window is less than an initially configured size of the SN window, if so, the SN window is deemed to be not full, and the PDCP entity then executes Step 304, otherwise, the SN window is deemed to be full, and the PDCP entity then executes Step 305;

Step 303: the PDCP entity determines whether the SN window is full, if not, the PDCP entity executes Step 310, if full, the PDCP entity executes Step 311;

specifically, the PDCP entity determines whether the number of PDU record in the SN window is less than an initially configured size of the SN window, if so, the SN window is deemed to be not full, and the PDCP entity then executes Step 310, otherwise, the SN window is deemed to be full, and the PDCP entity then executes Step 311;

Step 304: the PDCP entity processes the first SDU in the cache queue to obtain a PDU, transmits the obtained PDU to the RLC layer entity, adds a corresponding PDU record of PDU into the SN window, and adds the newly received SDU into the cache queue, then the process is finished;

Step 305: the PDCP entity determines whether the cache queue is full, if so, the PDCP entity then executes Step 306, otherwise, the PDCP entity executes Step 311;

specifically, the PDCP entity determines whether a maximum limit to the quantity of SDUs in the cache queue is reached, if so, the cache queue is deemed to be full, and the PDCP entity executes Step 306, otherwise, the PDCP entity executes Step 311;

Step 306: the PDCP entity determines whether there is any PDU record in the SN window whose weight value exceeds a predefined threshold value, if so, the PDCP entity executes Step 307, otherwise, the PDCP entity executes Step 308;

Step 307: the PDCP entity deletes the PDU record whose weight value exceeds the threshold value; and the PDCP entity executes Step 309;

Step 308: the PDCP entity discards a first PDU record from the SN window;

Step 309: the PDCP entity processes a first SDU in the cache queue into PDU, transmits the PDU to the RLC layer entity, and adds a corresponding PDU record into the SN window; and the PDCP entity executes Step 311;

Step 310: the PDCP entity processes the newly received SDU into a PDU, transmits the PDU to the RLC layer entity, and adds a corresponding PDU record into the SN window, then the process is finished; and Step 311: the PDCP entity adds the newly received SDU into the cache queue, and then the process is finished.

Figure 4:
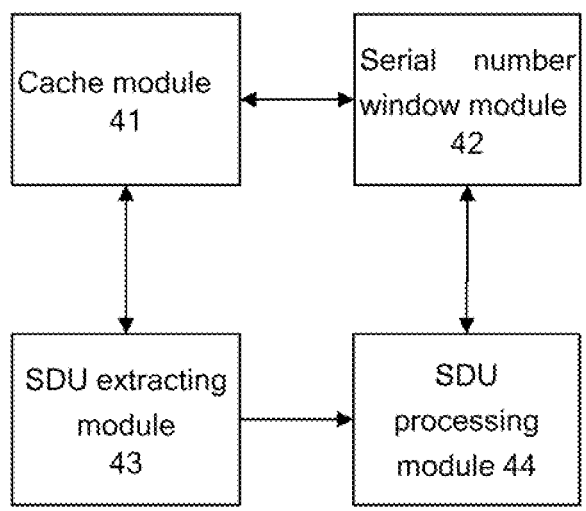
FIG. 4 shows a structural diagram of a packet data transmitting system for packet service domain of the disclosure.

On the basis of the method above, the disclosure further provides a packet data transmitting system for packet service domain; as shown in FIG. 4, the system includes: a cache module 41, a SN window module 42, a SDU extracting module 43 and a SDU processing module 44, in which, the cache module 41 is used for, after the PDCP entity receives the SDU, determining whether there is any SDU in a cache queue after a PDCP entity receives a SDU and sending a result of the determination to the SN window module 42, adding the SDU into the cache queue when receiving a notice that the SN window is full, informing the SN window module 42 when the cache queue is full, and adding the SDU into the cache queue after receiving a notice from the SDU extracting module 43;

the SN window module 42 is used for, informing the SDU extracting module 43 when the SN window is not full and the result of the determination is that there is at least one SDU in the cache queue, or informing the cache module 41 that the SN window is full, when the SN window module is full and the result of the determination is that there is zero or more SDU in the cache queue, and when receiving the notice that the cache queue is full, deleting PDU records whose weight values exceed the threshold value and informing the SDU extracting module 43, and further adding a PDU record of a processed PDU into the SN window after receiving the notice from the SDU processing module 44;

furthermore, the SN window module 42 is further used for, when the SN window is not full and the result of the determination is that there is no SDU in the cache queue, informing the SDU processing module 44, and when there is no PDU record whose weight value exceeds the threshold value, discarding a first PDU record in the SN window and informing the SDU extracting module 43;

the weight value of a PDU record in the SN window is specifically determined by: the SN window module 42 sets a timer in the SN window, sets the weight value for the PDU record, and increases the weight value for the PDU record in the SN window according to the set step value when the time of timer is up;

the SDU extracting module 43 is used for extracting a first SDU from the cache queue to the SDU processing module 44, and informing the cache module 41; and the SDU processing module 44 is used for processing the SDU extracted by the SDU extracting module 43 into a PDU, transmitting the PDU to the RLC layer entity, and informing the SN window module 42;

furthermore, the SDU processing module 44 is further used for, after receiving the notice from the SN window module 42, processing the SDU received by the PDCP entity into a PDU, transmitting the PDU to the RLC layer entity, and informing the SN window module 42.

The above is only the preferred embodiment of the disclosure and not intended to limit the scope of protection of the disclosure, and any modifications, equivalent replacements, improvements and the like within the spirit and principle of the disclosure shall fall within the scope of protection of the invention.

What is claimed is:

1. A packet data transmitting method for packet service domain, comprising:
 a Packet Data Convergence Protocol (PDCP) entity determining whether a Serial Number (SN) window is full after receiving a Service Data Unit (SDU);
 when the Serial Number (SN) window is full:
  the PDCP entity adding the SDU in a cache queue;
  the PDCP entity deleting a Protocol Data Unit (PDU) record from the SN window, wherein the deleted PDU record has a weight value exceeding a threshold value, when the cache queue is full; and
  the PDCP entity processing a first SDU in the cache queue into a PDU, transmitting the PDU to a Radio Link Control (RLC) layer entity, and adding a PDU record of the transmitted PDU into the SN window, wherein each PDU record in the SN window has the weight value for indicating a length of time of the PDU record in the SN window; and
 when the SN window is not full and there is at least one SDU is in the cache queue:
  the PDCP entity processing a first SDU in the cache queue into a PDU, transmitting the PDU to the RLC layer entity, and adding a PDU record of the transmitted PDU into the SN window.

2. The method according to claim 1, further comprising: when the SN window is not full and there is no SDU in the cache queue, the PDCP entity processing the newly received SDU into a PDU, transmitting the PDU to the RLC layer entity, and adding a PDU record of the transmitted PDU into the SN window.

3. The method according to claim 1, further comprising: when there is no PDU record in the SN window whose weight value exceeds the threshold value, the PDCP entity discarding a first PDU record in the SN window, processing a first SDU in the cache queue into a PDU, transmitting the PDU to the RLC layer entity, and adding a PDU record of the transmitted PDU into the SN window.

4. The method according to claim 1, wherein processing an SDU into a PDU includes: converting the SDU into the PDU in accordance with the 3GPP TS 25.323 protocol.

5. The method according to claim 1, wherein determining whether the SN window is full or not includes: determining whether a total number of PDU records in the SN window is less than a preconfigured size of the SN window such that, if the total number is less than the preconfigured size, the SN window is not full, otherwise; the SN window is full.

6. The method according to claim 1, wherein the weight value of a PDU record in the SN window is determining by:
 setting a timer in the SN window, and setting an initial weight value for each PDU record in the SN window to zero;
 before adding the PDU record to the SN window, determining whether there is another PDU record in the SN window, such that:
  if there is another PDU record in the SN window, starting the timer that was stopped previously; and
  if there is no PDU record in the SN window, stopping the timer, adding the PDU record to the SN window, and restarting the stopped timer; and
 when the timer is up, determined whether there is any PDU record in the SN window, such that:
  if there is one or more PDU records in the SN window, increasing the weight value of each PDU record in the SN window according to a preset step value and then restarting the timer; and
  if there is no PDU record in the SN window, stopping the timer.

7. A packet data transmitting system for packet service domain, comprising:
 a cache module configured for:

determining whether there is any SDU in a cache queue after a PDCP entity receives a SDU and sending a result of the determination to a SN window module;

adding the SDU into the cache queue when receiving a notice that a SN window is full or after receiving a notice from a SDU extracting module; and informing the SN window module when the cache queue is full;

the SN window module configured for:

informing the SDU extracting module when the SN window is not full and the result of the determination is that there is at least one SDU in the cache queue; or when the SN window is full, informing the cache module that the SN window is full and deleting a PDU record from the SN window, wherein the PDU record has a weight value exceeding a threshold value and informing the SDU extracting module when receiving a notice that the cache queue is full; and adding a PDU record of a processed PDU into the SN window after receiving a notice from a SDU processing module;

the SDU extracting module configured for extracting a first SDU in the cache queue and transmitting it to the SDU processing module, and informing the cache module; and the SDU processing module configured for processing a SDU extracted by the SDU extracting module into a PDU, transmitting the PDU to an RLC layer entity, and informing the SN window module.

8. The system according to claim 7, wherein the SN window module is further configured for, when the SN window is not full and the result of the determination is that there is no SDU in the cache queue, informing the SDU processing module, and when there is no PDU record in the SN window whose weight value exceeds the threshold value, discarding a first PDU record from the SN window and informing the SDU extracting module; and the SDU processing module is further configured for, after receiving a notice from the SN window module, processing the SDU received by the PDCP entity into a PDU, transmitting the PDU to the RLC layer entity, and informing the SN window module.

9. The method according to claim 2, wherein processing an SDU into a PDU includes: converting the SDU into the PDU in accordance with the 3GPP TS 25.323 protocol.

10. The method according to claim 3, wherein processing an SDU into a PDU includes: converting the SDU into the PDU in accordance with the 3GPP TS 25.323 protocol.

11. The method according to claim 2, wherein determined whether the SN window is full or not includes: determined whether a total number of PDU records in the SN window is less than a preconfigured size of the SN window such that, if the total number is less than the preconfigured size, the SN window is not full, otherwise; the SN window is full.

12. The method according to claim 3, wherein determining whether the SN window is full or not includes: determining whether a total number of PDU records in the SN window is less than a preconfigured size of the SN window such that, if the total number is less than the preconfigured size, the SN window is not full, otherwise; the SN window is full.

13. The method according to claim 2, wherein the weight value of a PDU record in the SN window is determined by:

setting a timer in the SN window, and setting an initial weight value for each PDU record in the SN window to zero;

before adding the PDU record to the SN window, determining whether there is another PDU record in the SN window, such that:

if there is another PDU record in the SN window, starting the timer that was stopped previously; and if there is no PDU record in the SN window, stopping the timer, adding the PDU record to the SN window, and restarting the stopped timer; and when the timer is up, determining whether there is any PDU record in the SN window, such that:

if there is one or more PDU records in the SN window, increasing the weight value of each PDU record in the SN window according to a preset step value and then restarting the timer; and if there is no PDU record in the SN window, stopping the timer.

14. The method according to claim 3, wherein the weight value of a PDU record in the SN window is determined by:

setting a timer in the SN window, and setting an initial weight value for each PDU record in the SN window to zero;

before adding the PDU record to the SN window, determining whether there is another PDU record in the SN window, such that:

if there is another PDU record in the SN window, starting the timer that was stopped previously; and if there is no PDU record in the SN window, stopping the timer, adding the PDU record to the SN window, and restarting the stopped timer; and when the timer is up, determining whether there is any PDU record in the SN window, such that:

if there is one or more PDU records in the SN window, increasing the weight value of each PDU record in the SN window according to a preset step value and then restarting the timer; and if there is no PDU record in the SN window, stopping the timer.

* * * * *